(12) United States Patent
Niwai et al.

(10) Patent No.: US 8,276,863 B2
(45) Date of Patent: Oct. 2, 2012

(54) DEVICE SUPPORT STAND
(75) Inventors: Yutaka Niwai, Osaka (JP); Masayuki Ohmori, Osaka (JP)
(73) Assignee: Kasatani Corp., Osaka-shi, Osaka (JP)
( * ) Notice: Subject to any disclaimer, the term of this patent is extended or adjusted under 35 U.S.C. 154(b) by 776 days.
(21) Appl. No.: 12/440,044
(22) PCT Filed: Sep. 25, 2007
(86) PCT No.: PCT/JP2007/068528
 § 371 (c)(1),
 (2), (4) Date: Mar. 5, 2009
(87) PCT Pub. No.: WO2008/038621
 PCT Pub. Date: Apr. 3, 2008
(65) Prior Publication Data
 US 2010/0187273 A1  Jul. 29, 2010
(30) Foreign Application Priority Data
 Sep. 28, 2006 (JP) .................................. 2006-266067
(51) Int. Cl.
 *E04G 3/00* (2006.01)
 *B60R 7/06* (2006.01)
(52) U.S. Cl. ...................... 248/278.1; 224/483; 224/555; 224/548; 224/553
(58) Field of Classification Search .................. 224/483, 224/548, 553, 555; 248/205.8, 276.1, 278.1, 248/281.11, 284.1, 447; 379/454
 See application file for complete search history.
(56) References Cited
U.S. PATENT DOCUMENTS
1,590,227 A * 6/1926 Britton ........................... 248/103
(Continued)

FOREIGN PATENT DOCUMENTS
JP  8-181935 A  7/1996
(Continued)

OTHER PUBLICATIONS
Notification of Transmittal of Translation of the International Preliminary Report on Patentability (Form PCT/IB/338) of International Application No. PCT/JP2007/068528 mailed Apr. 9, 2009 with Forms PCT/IB/373 and PCT/ISA/237.
(Continued)

*Primary Examiner* — Nathan J Newhouse
*Assistant Examiner* — Steven M Landolfi, Jr.
(74) *Attorney, Agent, or Firm* — Westerman, Hattori, Daniels & Adrian, LLP

(57) ABSTRACT

A device support stand has a base fixed to a device on which the support stand is installed, a first support shaft upstanding from the base, a second support shaft extended on a line perpendicular to the first support shaft and joined to the first support shaft via a first movable section, a third support shaft placed at a portion a predetermined distance away from the first support shaft, a fourth support shaft extended on a line perpendicular to the third support shaft and joined to the third support shaft via a second movable section, a pair of first and second connection frames joined to the fourth support shaft via third and fourth movable sections, respectively, and a device fixation member for device installation, installed on one end of the third support shaft. The first and second connection frames are joined together by adjustment/joint means for adjusting the spacing between the first and second connection frames so as to limit rotation of the first to fourth movable sections. The device on which the support stand is installed can be moved up, down, left, and right and can be fixed to a rear low position after changing its angle.

10 Claims, 6 Drawing Sheets

U.S. PATENT DOCUMENTS

| | | | | |
|---|---|---|---|---|
| 1,932,697 A | * | 10/1933 | Jankovic | 248/478 |
| 3,910,538 A | * | 10/1975 | Baitella | 248/124.1 |
| 4,836,485 A | * | 6/1989 | Cooper | 248/278.1 |
| 4,953,822 A | * | 9/1990 | Sharber et al. | 248/281.11 |
| 5,275,465 A | * | 1/1994 | Gulliver et al. | 297/173 |
| 5,443,237 A | * | 8/1995 | Stadtmauer | 248/441.1 |
| 5,566,030 A | * | 10/1996 | Yue | 359/872 |
| 5,845,885 A | * | 12/1998 | Carnevali | 248/181.1 |
| 6,113,046 A | * | 9/2000 | Wang | 248/278.1 |
| 6,464,185 B1 | * | 10/2002 | Minelli et al. | 248/183.1 |
| 6,484,994 B2 | * | 11/2002 | Hokugoh | 248/371 |
| 6,672,553 B1 | * | 1/2004 | Lin | 248/276.1 |

FOREIGN PATENT DOCUMENTS

| | | |
|---|---|---|
| JP | 8-312885 A | 11/1996 |
| JP | 3058611 U | 6/1999 |
| JP | 3091972 U | 2/2003 |
| JP | 2004-262381 A | 9/2004 |
| JP | 2005-199845 A | 7/2005 |
| JP | 3116100 U | 11/2005 |

OTHER PUBLICATIONS

International Search Report of PCT/JP2007/068528; Mailing Date of Oct. 30, 2007.

* cited by examiner

DEVICE SUPPORT STAND

TECHNICAL FIELD

The present invention relates to a device support stand, and particularly relates to a support stand for mounting and fixing in a simple manner a small television, car navigation, or other small electronic device to, e.g., the dashboard, glove box, or the like of an automobile.

BACKGROUND ART

In recent years, small, lightweight, portable televisions, radios, stereos, and other electronic devices that can be easily carried have been developed and marketed in addition to conventional installed models. Such devices can be carried from a home to the outdoors and can be used in the so-called "outdoors." For example, such devices can be brought inside an automobile, and sporting events can be watched on a television, information can be obtained, and other activities can be carried out.

However, when mounting such a device in a vehicle, there are various other devices already mounted in the vehicle, and the mounting space is limited because of the narrow space. On the other hand, when the device is to be mounted near the driver's seat, it must also be mounted so as to not become an obstruction to the driving of the driver and so that a passenger can also see the screen or the like. In recent years, various types of support implements have been developed that satisfy these situations and conditions, that simplify mounting, and that allow the angle of the device display screen to be freely modified in the horizontal and vertical directions (e.g., see Patent References 1 and 2 noted below).

For example, the support implement described in the Patent Reference 1 noted below comprises a cylindrical support column which is erectly disposed on an upper surface of a base plate and in which convexities and concavities are disposed about the external peripheral surface, and further comprises a pair of holding members that can be rotated in the circumferential direction and that have a concavo-convex section on the internal peripheral surface meshed with the concavo-convex section of the support column, and a support member that can be moved in the forward/rearward direction and that is held between the holding members, wherein a fixing member to which the device is to be attached is mounted on the support member.

The support member and the holding members are joined together using a fastening bolt, and the support implement can be positionally modified to a predetermined angle by loosening an adjustment knob mounted on the bolt.

A similar support implement is also described in Patent Reference 2 noted below. FIG. 6 is a perspective view of a mounting device for an onboard display apparatus described in Patent Reference 2 below.

The mounting device for an onboard display apparatus (hereinbelow simply referred to as mounting device) 20 comprises a base 21 on which a short shaft is erectly disposed, a horizontal arm turnably mounted on the shaft so as to be capable of rotation about a single axis via a first movable section, a pair of connection plates 23, 23 pivotably connected to the two ends of the horizontal arm in the lengthwise direction via a pair of second movable sections 22, 22, and a display apparatus hanging member 25 pivotably suspended between the distal ends of the connection plates 23, 23 via third movable sections 24, 24. The horizontal arm is formed from a rectangular member having a shaft insertion hole in the center section and a pair of curved members in which the end sections are upwardly curved in the shape of an "L" at the two ends in the lengthwise direction. Each of the first to third movable sections has a free stop mechanism, and the free stop mechanism is composed of a wide washer, a narrow washer, a lock member, a coned disc spring, and the like.

With the mounting device 20, the display apparatus M can be adjusted in all directions by merely manually moving the display apparatus in the vertical and lateral directions in the case that the screen angle of the display apparatus M is to be adjusted, because the hanging member 25 is connected to the shaft of the base 21 via the first to third movable sections.

[Patent Reference 1]: Utility Model Registration No. 3091972 (FIG. 1, paragraphs [0020] and [0021])

[Patent Reference 2]: Japanese Laid-open Patent Application No. 2005-199845 (FIG. 1, FIG. 2, paragraphs [0022] to [0040])

DISCLOSURE OF THE INVENTION

Problems the Invention is Intended to Solve

With the support implement of Patent Reference 1 described above, a device can be adjusted and fixed at any angle. However, the support implement is rotatably mounted on the external periphery of the support column on which a pair of holding members is erectly disposed. Therefore, the support member fixed to the upper end of the holding members is too thick. Accordingly, when the device mounted on the support member is pushed downward, the downward movement is limited because the support member is too thick. Therefore, when the support implement is mounted on, e.g., the dashboard or the glove box of a car, the visual field of the driver is liable to be obstructed depending on the mounting location of the support implement. Also, when the adjustment knob is loosened to adjust the angle, it is possible that the holding members, the support member, and the support columns will no longer be joined together and the components will disassemble. In such a case, it is onerous to reassemble and adjust the components.

In the mounting implement of Patent Reference 2 described above, the display apparatus M can be adjusted and fixed in a low position at any angle because the hanging member 25 is connected to the shaft of the base 21 via first to third movable sections. However, the mounting implement is configured such that the shaft and the horizontal arm require high mechanical strength because the entire load is placed on the rectangular horizontal arm fixed to the shaft, which is erectly disposed on the base. Accordingly, when the display apparatus mounted on the hanging member is heavy, the horizontal arm is liable to tilt in the left or right direction, or to deform when subjected to strong vibrations or the like, and similarly tilt in either direction. When such a tilting occurs, it is difficult to return to a normal orientation, and the display screen is difficult to view in a tilted state.

The first to third movable sections between the hanging member 25 and the shaft of the base 21 are composed of a free stop mechanism in a total of five locations in a movable configuration, and the free stop mechanisms are each composed of a wide washer, a narrow washer, a lock member, a coned disc spring washer, a lock nut, a relatively long connection member (bolt), and other components. Therefore, the number of components is high, resulting in high component costs; the assembly labor is high; and it is difficult in increase work efficiency. Since the five movable sections are each independent mechanisms, it is laborious to adjust each free stop mechanism because the adjustment must be carried out for each of the mechanisms.

In recent years, a need has developed for such a support implement that is capable of moving an electronic device to a low position so that the electronic device or the like fixed to the support implement does not obstruct the driver's field of vision and does not interfere with driving in the case that the device is mounted on the dashboard or glove box of a vehicle. There is also a need for vibration resistance to be provided because the device undergoes strong vibrations when mounted in a vehicle, and there is further a need for the device to be easily adjusted in terms of position and to have design characteristics as a decorative ornament.

In view of the above, the present invention was contrived based on the issues and needs of the prior arts. Therefore, an object of the present invention is to provide a device support stand that allows the angle of a mounted device to be modified in the vertical and lateral directions and, in particular, be moved and fixed in a low position.

Another object of the present invention is to provide a device support stand that allows a plurality of support shafts to be controlled in a single location and facilitates the modification of the angle of a mounted device.

Another object of the present invention is to provide a device support stand that increases the joining surface area among the plurality of support shafts to increase mechanical strength.

Yet another object of the present invention is to provide a device stand that increases component sharing to reduce the number of components and to simplify assembly.

Means for Solving the Abovementioned Problems

In order to achieve the above-stated goals, the device support stand according to an embodiment of the present invention is characterized in comprising:

a mounting member for fixing devices to be mounted in a vehicle or the like;

a first support shaft erectly provided from the mounting member;

a second support shaft joined to the first support shaft via a first movable section, the shaft being extended on a line orthogonal to the first support shaft;

a third support shaft disposed in a location set at a predetermined distance from the first support shaft;

a fourth support shaft joined to the third support shaft via a second movable section, the shaft being extended on a line orthogonal to the third support shaft;

a pair of first and second connection members joined to the second and fourth support shafts via third and fourth movable sections, respectively; and a device fixation member for mounting a device, the member being mounted at one end of the third support shaft, wherein the first and second connection members are joined by an adjustment/joining means for adjusting the space between the first and second connection members so as to limit the rotation of the first to fourth movable sections.

In accordance with the aspect described above, for example, a third support shaft is disposed at a right angle to a first support shaft in a location set at a distance from the first support shaft; second and fourth support shafts are joined at a right angle to the first and third support shafts; and a pair of first and second connection members is joined between the third and fourth support shafts, respectively, whereby the first to fourth support shafts and the connection members can be set low in relation to the mounting member. Accordingly, a device to be mounted on the third support shaft can be moved and fixed in a low position. Therefore, a car navigation device or another device can be moved and fixed in a low position even if, for example, the device support stand is mounted on the dashboard of an automobile; the visual field of the driver is not obstructed; and driving is not interfered with.

The first and second support shafts, and the third and fourth support shafts are joined via the first and second movable sections; the second and fourth support shafts are joined by the first and second connection members via the third and fourth movable sections; and the first and second connection members are joined by adjustment/joining means for adjusting the frictional force and rotational angle of the first to fourth movable sections. Therefore, four support shafts, i.e., the first to fourth movable sections can be controlled by operating single adjustment/joining means, and a device to be mounted on the third support shaft can thereby be modified to any angle in a simple manner. In other words, the degree of freedom of the angle adjustment is improved because the arrangement and orientation of a device can be adjusted by quadriaxial control. For this reason, the device support stand can be advantageously used by suitably adjusting the angle, even when mounted on a dashboard of a vehicle or another location tilted or curved due to design characteristics, or in a position in which mounting was not conventionally possible because of inconvenience.

In the device support stand according to the embodiment described above, it is preferred that:

the first and third support shafts each comprise cylindrical shafts having a predetermined thickness and length;

the second and fourth support shaft comprise a pair of first and second T shafts;

each pair of T shafts comprise a semi-cylindrical section that makes contact with the essentially semicircular peripheral surface of the cylindrical shafts of the first and third shafts, and a cylindrical section that protrudes at a right angle from the external surface of the semi-cylindrical section;

a pair of semi-cylindrical sections of the first and second T shafts of the second support shaft be joined to the external peripheral surface of the first support shaft via the first movable section;

a pair of semi-cylindrical sections of the first and second T shafts of the fourth support shaft be joined to the external peripheral surface of the third support shaft via the second movable section; and the opposing end sections of the cylindrical section between the T shafts be joined to the first and second connection members via the third and fourth movable sections, respectively.

In accordance with the aspect described above, the first and third support shafts comprise cylindrical shafts, and the second and fourth support shafts comprise a pair of T shafts having semi-cylindrical sections that are in contact with the substantially semicircular peripheral surface of the semi-cylindrical first and second support shafts, respectively, whereby the contact surface area of the first to fourth movable sections between the first support shaft and the second support shaft as well as the third support shaft and the fourth support shaft is increased, the first to fourth support shafts are stably supported by the movable sections, and the mechanical strength is enhanced.

In the device support stand according to the embodiment described above, it is preferred that the first support shaft and third support shaft, and the second support shaft and fourth support shaft be formed from support shafts having the same configuration.

In accordance with the aspect described above, the first support shaft and third support shaft, and the second support shaft and fourth support shaft use support shafts having the same configuration. Therefore, the components can be shared, the types of components are reduced, and costs can be lowered. Assembly is facilitated because it is not necessary to distinguish between components or to confirm orientation.

In the device support stand according to the embodiment described above, it is preferred that the adjustment/joining means comprise adjustment means for adjusting a space between the first and second connection members and adjusting a rotational angle and frictional force of the first to fourth movable sections, and joining means for movably guiding at least one among the first and second connection members by operation of the adjustment means; and the joining means be provided with a retaining member for holding the assembly of the first and second connection members so as to prevent disassembly when the adjustment means is loosened.

In the device support stand according to the embodiment described above, it is preferred that the joining means have a guide member for guiding the joining of the two connection members, being provided to one connection member among the first and second connection members, and the retaining member provided to the distal end of the guide member; the adjustment means have an adjustment screw provided to one connection member among the first and second connection members, and a screw hole into which the adjustment screw is threaded, the hole being provided to the other connection member; and the adjustment screw be threadably joined to the screw hole, and a gap between the first and second connection members be adjusted, when adjustment is carried out by the adjustment means.

In accordance with the aspect described above, the adjustment means can be stably operated because the first and second connection members are held by a retaining member of the joining means so as to prevent disassembly, even when the adjustment means is excessively loosened. Since the first and second connection members do not become disassembled and fall apart, the first to fourth support shafts can be easily and stably fixed again after the adjustment means has been loosened.

In the device support stand according to the embodiment described above, it is preferred that the guide member have two protruding guide rods; the two protruding guide rods be provided with a predetermined spacing in the lengthwise direction of the connection members; and the adjustment means be provided between the two protruding guide rods.

In accordance with the aspect described above, the spacing between the pair of connection members can be stably adjusted by forming the guide members using two protruding guide rods. Also, the spacing can be stably adjusted by providing the adjustment means between the two protruding guide rods.

In the device support stand according to the embodiment described above, it is preferred that the first to fourth movable sections be formed from gear members in which gear teeth mesh with each other, or from friction members that are joined by a predetermined mutual frictional force.

In accordance with the aspect described above, the first to fourth movable sections are formed from gear members in which gear teeth mesh with each other, or from friction members that are joined by a predetermined mutual frictional force, whereby movable sections can be provided with high mechanical strength and vibration resistance. The number of components is reduced, assembly is facilitated, and gap adjustment can be carried out in a simple manner in comparison with, e.g., the movable section mechanism of mounting implement disclosed in Patent Document 2 described above.

In the device support stand according to the embodiment described above, it is preferred that a compressive elastic member be disposed between the third and fourth movable sections.

In accordance with the aspect described above, the force of the movable section can be adjusted more smoothly by providing a spring or another compressive elastic member between the third and fourth movable sections.

In the device support stand according to the embodiment described above, it is preferred that the mounting member comprise a holding member or a plate-shaped base having a predetermined surface area.

In accordance with the aspect described above, mounting is possible in flat locations and in locations having concavities and convexities by configuring the mounting member as a holding member or a plate-shaped base having a predetermined surface area.

In the device support stand according to the embodiment described above, it is preferred that the base comprise a layered body constituted by a plate-shaped base plate having a predetermined size, a double-sided adhesive tape affixed to the reverse surface of the base plate, and a decorative plate affixed to the upper surface of the base plate; and a mounting section for mounting the first support shaft be provided in substantially the center of the layered body.

In accordance with the aspect described above, the base comprises a layered body constituted by a plate-shaped base plate having a predetermined size, a double-sided adhesive tape affixed to the reverse surface of the base plate, and a decorative plate affixed to the upper surface of the base plate, and can thereby be stably mounted on a flat mounting location, e.g., the dashboard, glove box, or the like of an automobile. Also, the appearance is improved by covering the base using a decorative plate.

Figure 1:
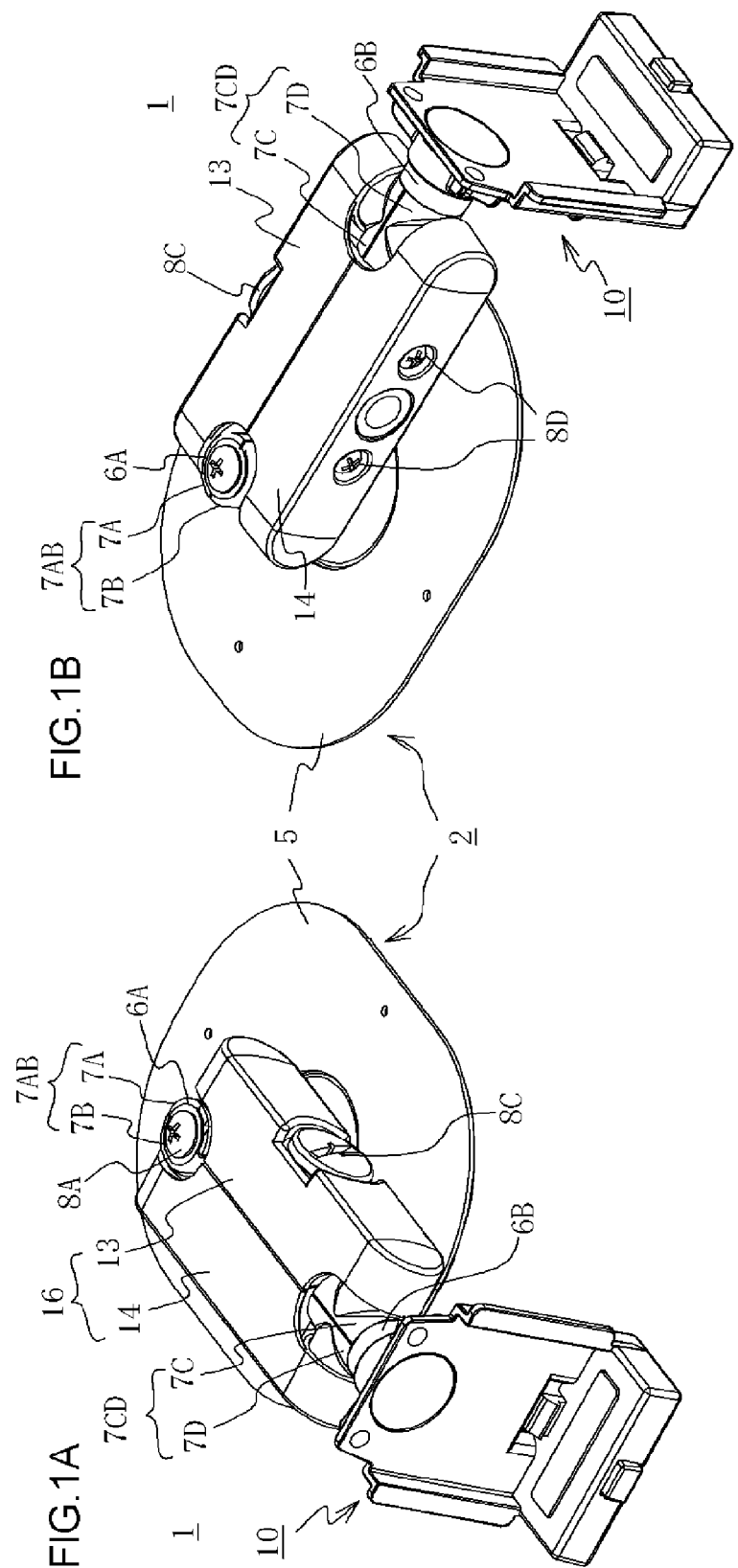
FIG. 1A is a perspective view of the external appearance of the device support stand according to an embodiment of the present invention.
FIG. 1B is a perspective view of the support stand of FIG. 1A as seen from another angle.

KEY TO SYMBOLS 1 device support stand
2 base
3 base plate
4 double-sided adhesive tape
5 decorative cover
6A first support shaft
6B third support shaft
7a semi-cylindrical section
7b small diameter cylindrical section
$6_1, 7_1, 7_2, 13_2, 14_2$ gear teeth 7AB second support shaft
7CD fourth support shaft
7A to 7D first to fourth T shafts
8A, 8B bolts
8C adjustment screw
8D setscrew
9A, 9B nuts
10 device fixation member
11 cover body
12 latch member
13 first connection frame
13a, 14a first large diameter cylindrical sections
13b, 14b second large diameter cylindrical sections
13c, 13d protruding guide rods
14 second connection frame
16 connection member
$S_1$ compression spring

BEST MODE FOR CARRYING OUT THE INVENTION

Preferred embodiments of the present invention will be described in detail hereinafter with reference to the drawings. However, the embodiments described below are examples of a device support stand for implementing the technical concept of the present invention and are not intended to specify the present invention to a device support stand, and equivalent application can also be made to other embodiments contained within the scope of the claims.

Example 1

Figure 2:
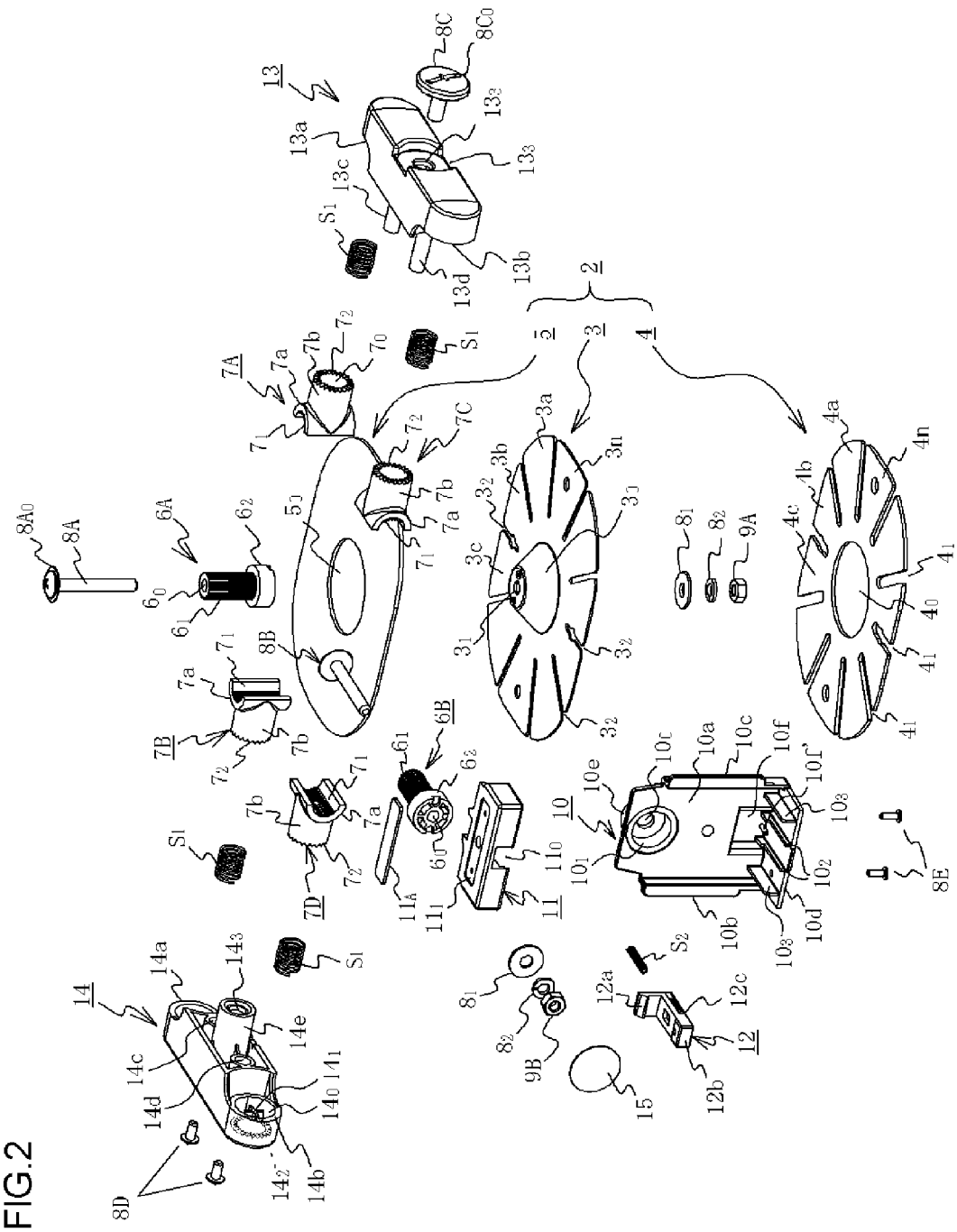
FIG. 2 is an exploded perspective view of the device support stand of FIG. 1.

FIG. 1 shows the device support stand according to an embodiment of the present invention. FIG. 1A is a perspective view of the external appearance of the device support stand. FIG. 1B is a perspective view of the external appearance of the support stand of FIG. 1A as seen from another angle. FIG. 2 is an exploded perspective view of the device support stand of FIG. 1.

The device support stand 1 is provided with a plate-shaped base 2 having a predetermined size; a first support shaft 6A having a predetermined length and being erectly disposed perpendicular from substantially the center section of the base 2; a second support shaft 7AB connected to the first support shaft in a substantially right angle direction via a first movable section; a third support shaft 6B disposed in a substantially perpendicular direction to the first support shaft 6A, being disposed in a location set at a distance from the first support shaft; and a fourth support shaft 7CD connected in a substantially right angle direction to the third support shaft 6B via a second movable section, as shown in FIGS. 1 and 2. The second and fourth support shafts 7AB, 7CD are connected by a connection member 16 having a predetermined length via third and fourth movable sections, respectively, and have a configuration in which a device fixation member 10 is mounted on an end section of the third support shaft 6B. The configuration of the base, the first to fourth support shafts, the first to fourth movable sections, and the device fixation member will be described in sequence below.

The base 2 is composed of a layered body obtained by layering a substantially elliptical plate-shaped base plate 3 having a size that allows the base plate to be mounted and fixed in a relatively flat location of the dashboard, glove box, or the like of a vehicle, a double-sided adhesive tape 4 fixed to the reverse side of the base plate 3, and a decorative cover 5 affixed to the upper surface of the base plate 3, as shown in FIG. 2.

The base plate 3 is formed from metal plate material, and has a protuberance $3_0$ that protrudes upward in the shape of a crest formed in substantially the center section, and a screw hole $3_1$ provided in the center of the protuberance $3_0$. The base plate 3 is formed from plate pieces $3a, 3b, 3c, \ldots, 3n$ that are divided by a plurality of slits $3_2$ extending from the edge of the protuberance $3_0$ in the outward radial direction. The plate pieces $3a$ to $3n$ can be curved and readily mounted on an onboard fixation surface by providing a plurality of slits $3_2$ in this manner.

The double-sided adhesive tape 4 has substantially the same shape as the base plate 3 and has an adhesive coated on the front and reverse surfaces. The double-sided adhesive tape 4 is divided into a plurality of tape pieces $4a, 4b, 4c, \ldots, 4n$ having a plurality of slits $4_1$ similarly provided in locations that correspond to the slits $3_2$ of the base plate 3. An opening $4_0$ having a size that allows the bottom surface of the protuberance $3_0$ to be exposed is formed in a location that corresponds to the protuberance $3_0$.

The decorative cover 5 is formed from a decorative plate for covering the surface of the base plate 3. An opening $5_0$ having a size that allows the protuberance $3_0$ to be exposed is formed in a location that corresponds to the protuberance $3_0$. The slits $3_2$ of the base plate are concealed and the appearance is improved by covering the base plate 3 with the decorative cover 5. The decorative cover 5 preferably has a color and pattern that matches the surface on which the device support stand 1 is placed and fixed. Another mounting member, e.g., a clip or another holding member or suction cup may be used in place of the base 2.

The first support shaft 6A is composed of a cylindrical support column having a predetermined thickness and length and having a bolt through-hole $6_0$ in the center section in the lengthwise direction. The external periphery of the first support shaft 6A is divided into a gear section in which a plurality of gear teeth $6_1$ are formed in the lengthwise direction and a non-gear section $6_2$ having a predetermined length in which gear teeth are not provided, and is formed from a metal material or a resin material. The gear teeth $6_1$ are formed using serrated teeth at a predetermined pitch in the lengthwise direction of the support shaft, and mesh with later-described gear teeth $7_1, 7_1$ of the second support shaft 7AB. The first support shaft 6A has a bolt 8A that is passed through the bolt through-hole $6_0$ and inserted into the screw hole $3_1$ of the base 2, has an intermediately disposed flat washer $8_1$ and spring washer $8_2$ from below the base 2, and is fastened and fixed by a nut 9A.

A flange bolt having a flange $8A_0$ of a predetermined size on the head section is used as the bolt 8A. The diameter of the flange $8A_0$ is preferably slightly greater than the diameter of the first support shaft 6A. The head section of the first support shaft 6A is pressed, fastened, and fixed with a large surface area by using such a flange bolt. The later-described second support shaft 7AB can be retained by making the diameter of the flange $8A_0$ to be greater than the diameter of the first support shaft 6A. A washer or the like having a predetermined diameter may be used in place of the flange bolt. The first support shaft 6A is erectly disposed and fixed perpendicular to the base 2, and rotation stop means (not shown) is provided to the base 2 so as to prevent rotation.

The second support shaft 7AB is divided into a pair of first and second T shafts 7A, 7B, and the first and second T shafts have the same configuration. The first and second T shafts 7A, 7B are composed of a semi-cylindrical section 7a of a size that makes contact with a substantially semicircular surface of the cylindrical first support shaft 6A, and a small diameter cylindrical section 7b that protrudes at a right angle from the external wall surface of the semi-cylindrical section 7a, and has gear teeth $7_1$ that mesh with the gear teeth $6_1$ of the first support shaft 6A formed inside the semi-cylindrical section 7a. A cavity $7_0$ into which a compression spring $S_1$ is inserted is formed inside the small diameter cylindrical section 7b. Gear teeth $7_2$ are formed on the annular opening surface of the cavity $7_0$. The gear teeth $7_1$, $7_1$ of the first and second T shafts 7A, 7B and the gear teeth $6_1$ of the external peripheral surface of the first support shaft 6A constitute the first movable section. The meshing of the gear teeth $6_1$, $7_1$ is adjusted by the spring force of the compression spring $S_1$. The joining with the first support shaft 6A is stable because the semi-cylindrical sections 7a, 7a of the T shafts 7A, 7B mesh with the gear teeth $6_1$ of the first support shaft 6A, i.e., mesh with the gear teeth $6_1$ so as to cover the first support shaft 6A over a wide range in the lengthwise direction of the first support shaft. The T shafts 7A, 7B are joined to the first support shaft 6A as described above, and can thereby be made to stably rotate in a position near the surface of the base 2 about the first support shaft 6A erectly disposed from the base 2, i.e., in a low position without being set at a distance the surface of the base 2.

The third support shaft 6B has the same configuration as the first support shaft 6A, but is mounted in a different direction from the first support shaft 6A during assembly. In other words, the first support shaft 6A is erectly disposed substantially perpendicular to the base 2, and the third support shaft 6B is mounted in a direction that is at a right angle to the first support shaft 6A.

The fourth support shaft 7CD is divided into a pair of third and fourth T shafts 7C, 7D. The third and fourth T shafts 7C, 7D have the same configuration as the first and second T shafts 7A, 7B, and the third and fourth T shafts 7C, 7D are mounted in a direction that is at a right angle to the first and second T shafts 7A, 7B in a similar relationship between the first and third support shafts 6A, 6B. The gear teeth $7_1$, $7_1$ of the third and fourth T shafts 7C, 7D and the gear teeth $6_1$ of the third support shaft 6B constitute the second movable section. The meshing of the gear teeth $6_1$, $7_1$ is adjusted by a compression spring $S_1$ accommodated inside the cavity $7_0$ of the third and fourth T shafts 7C, 7D. Since the semi-cylindrical sections 7a, 7a of the T shafts 7C, 7D cover the gear teeth $6_1$ of the third support shaft 6B over a wide range in the lengthwise direction and mesh with the gear teeth $6_1$, the joining with the second support shaft is stabilized. The fourth support shaft 7CD meshes with third support shaft 6B and can be made to stably rotate about the third support shaft 6B.

As described above, the first and third support shafts 6A, 6B are provided with the same configuration, and the second and fourth support shafts 7AB, 7CD are similarly provided with the same configuration, whereby components can be shared, the number of types of components is reduced resulting in lower costs, and assembly is simplified.

The connection member 16 is divided into a pair of first and second connection frames 13, 14. The first and second connection frames 13, 14 are composed of rectangular parallelepiped blocks having a predetermined width, height, and length, internally accommodate the first to fourth T shafts 7A to 7D, have a decorative external wall surface, and are formed from a resin molded article.

Figure 4:
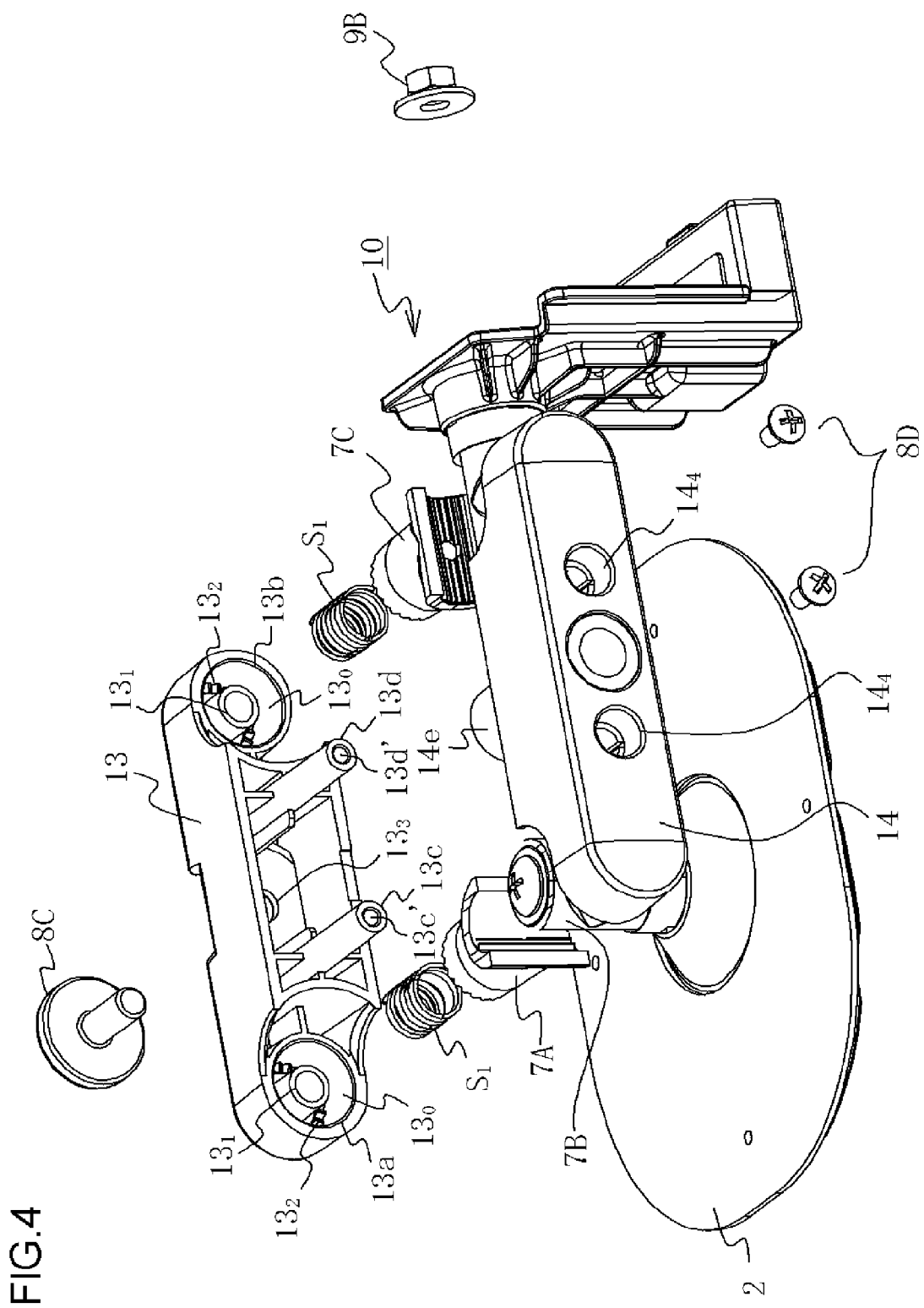
FIG. 4 is a perspective view of the support stand of FIG. 3 as seen from another angle.

The first connection frame 13 has first and second large diameter cylindrical sections 13a, 13b into which the semi-cylindrical sections 7a, 7a of the first and third T shafts 7A, 7C are inserted are provided to the two end sections, and a first joining means is provided for joining a second connection frame 14 between the first and second large diameter cylindrical sections 13a, 13b, as shown in FIGS. 2 and 4. The first large diameter cylindrical section 13a has a cavity $13_0$ into which the small diameter cylindrical section 7b of the first T shaft 7A is inserted, and the cavity $13_0$ has an interior wall that is blocked off by the external wall of the first connection frame 13, and a cylindrical projection $13_1$ onto which the compression spring $S_1$ is mounted projects from the interior wall. The cylindrical projection $13_1$ is positioned substantially in the center of the cavity $13_0$, and has gear teeth $13_2$ that mesh with the gear teeth $7_2$ of the first T shaft 7A and that are formed on the external periphery of the protrusion. The second large diameter cylindrical section 13b also has the same structure as the first large diameter cylindrical section 13a.

The first joining means has a screw hole $13_3$ provided substantially in the center in the lengthwise direction, two protruding guide rods 13c, 13d that protrude from the frame surface to the two sides of the screw hole $13_3$, and an adjustment screw 8C. Preferably formed in the surface of the connection frame 13 in the periphery of the screw hole $13_3$ is a concavity $13_3$, for accommodating the head section of the adjustment screw 8C. When the concavity $13_3$, is provided, the head section of the adjustment screw 8C does not protrude from the surface of the frame, a finger or the like will not catch, and appearance is improved. The adjustment screw 8C is threaded into the second connection frame 14 and functions as an adjustment knob for adjusting the distance of the gap between the first and second connection frames 13, 14. Therefore, narrow groove $8C_0$ is formed in the head section so as to allow rotation when a coin or the like is inserted. Female screw holes 13c', 13d' are formed in the distal ends of the protruding guide rods 13c, 13d.

The second connection frame 14 has second joining means for joining the first connection frame 13 and the third and fourth large diameter cylindrical sections 14a, 14b in which the small diameter cylindrical sections 7b, 7b of the second and fourth T shafts 7B, 7D are inserted in the two ends, as shown in FIG. 2. The third and fourth large diameter cylindrical sections 14a, 14b have substantially the same structure as the first and second large diameter cylindrical sections 13a, 13b, and have a cavity $14_0$ into which the small diameter cylindrical section 7b of the second and fourth T shafts 7B, 7D are inserted. The cavity $14_0$ has an interior wall that is blocked off by the external wall of the second connection frame 14, and a projection $14_1$ onto which the compression spring $S_1$ is mounted protrudes from the interior wall. The projection $14_1$ is positioned substantially in the center of the cavity $14_0$, and has gear teeth $14_2$ that mesh with the gear teeth $7_2$ of the second and fourth T shafts 7B, 7D and that are formed on the external periphery of the protrusion $14_1$. The gear teeth $14_2$ are hidden in FIG. 2 and are therefore shown as a dotted line.

Figure 3:
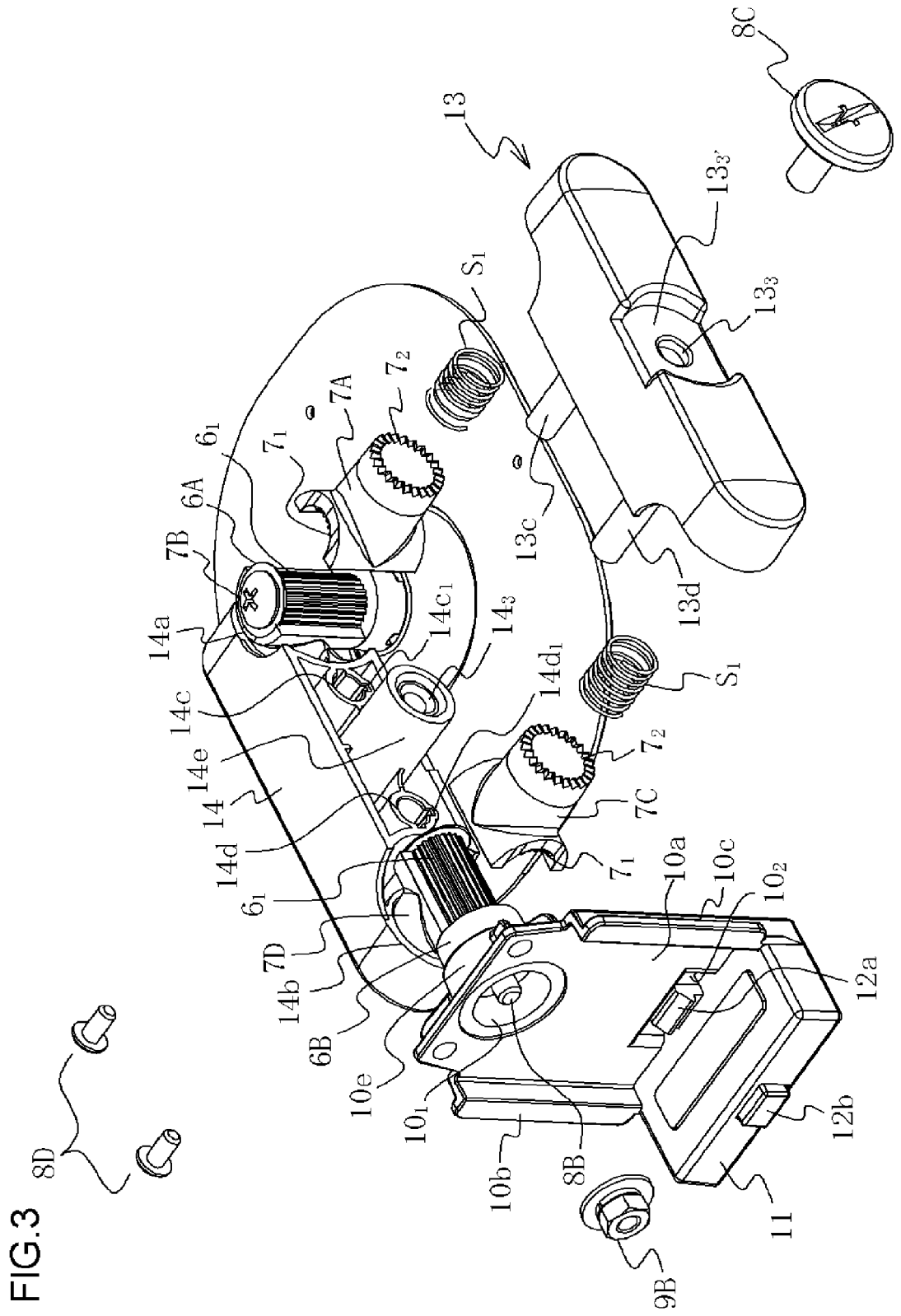
FIG. 3 is a perspective view showing an assembled state in which the second connection frame is mounted on the first and second support shafts and the first connection frame is mounted on the first and second support shafts.

The second joining means has a protruding rod 14e that protrudes a predetermined length from the frame surface substantially in the center in the lengthwise direction, two small diameter cylindrical sections 14c, 14d provided to the two sides of the protruding rod 14e, and two setscrews 8D, 8D, as shown in FIGS. 2 and 3. A female screw hole $14_3$ is formed in the distal end of the protruding rod 14e, and the adjustment screw 8C is threaded into the female screw hole $14_3$. The configuration functions to adjust the distance of the gap between the first and second connection frames 13, 14 when the threaded state of the adjustment screw 8C threaded into the protruding rod 14e is adjusted. The protruding guide rods 13c, 13d float within the small diameter cylindrical sections 14c, 14d of the second connection frame 14 in order to allow for the adjustment. In other words, the protruding guide rods 13c, 13d of the first connection frame 13 are fitted into the small diameter cylindrical sections 14c, 14d of the second connection frame 14 when the first and second connection frames 13, 14 are joined, and are fixed by threading the setscrews 8D, 8D into the female screw holes 13c', 13d' via later-described recessed holes $14_4$, $14_4$ disposed in the distal ends of the protruding guide rods 13c, 13d. The head sections of the setscrews 8D, 8D and the protruding guide rods 13c, 13d are separated by a predetermined distance, even in a state in which the setscrews 8D, 8D are completely threaded. Specifically, a gap having a predetermined length (e.g., about 3.0 mm) is formed between the bottom of the recessed holes $14_4$, $14_4$ and the head section of the setscrews 8D, 8D when the first and second connection frames 13, 14 are fixed to each other. When the adjustment screw 8C is loosened in such a configuration, the protruding guide rods 13c, 13d are fixed with leeway inside the small diameter cylindrical sections 14c, 14d so as to allow movement in the joining direction, even after the setscrews 8D, 8D have been threaded.

Figure 5:
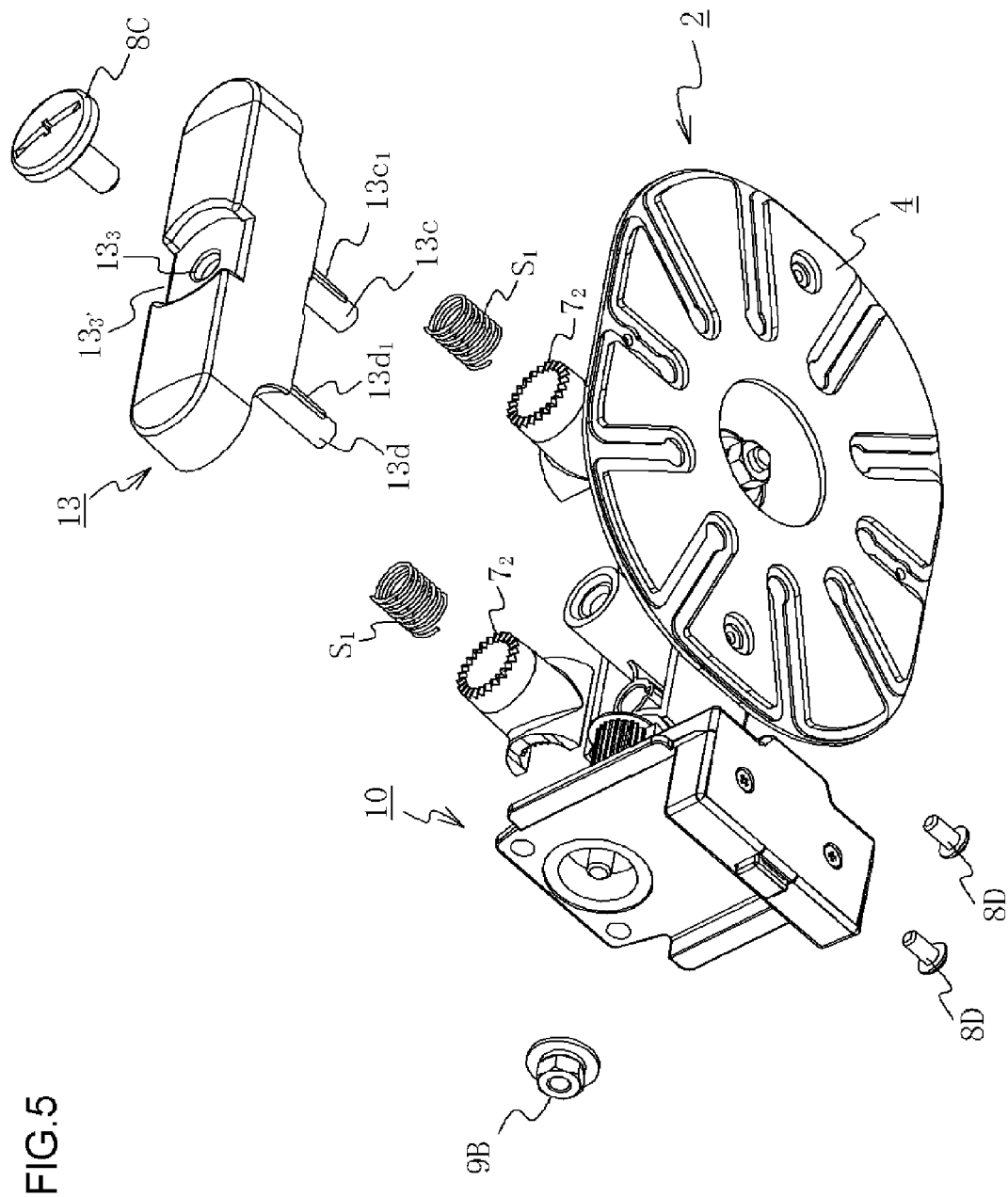
FIG. 5 is a perspective view of the support stand of FIG. 3 as seen from the bottom section.
Figure 6:
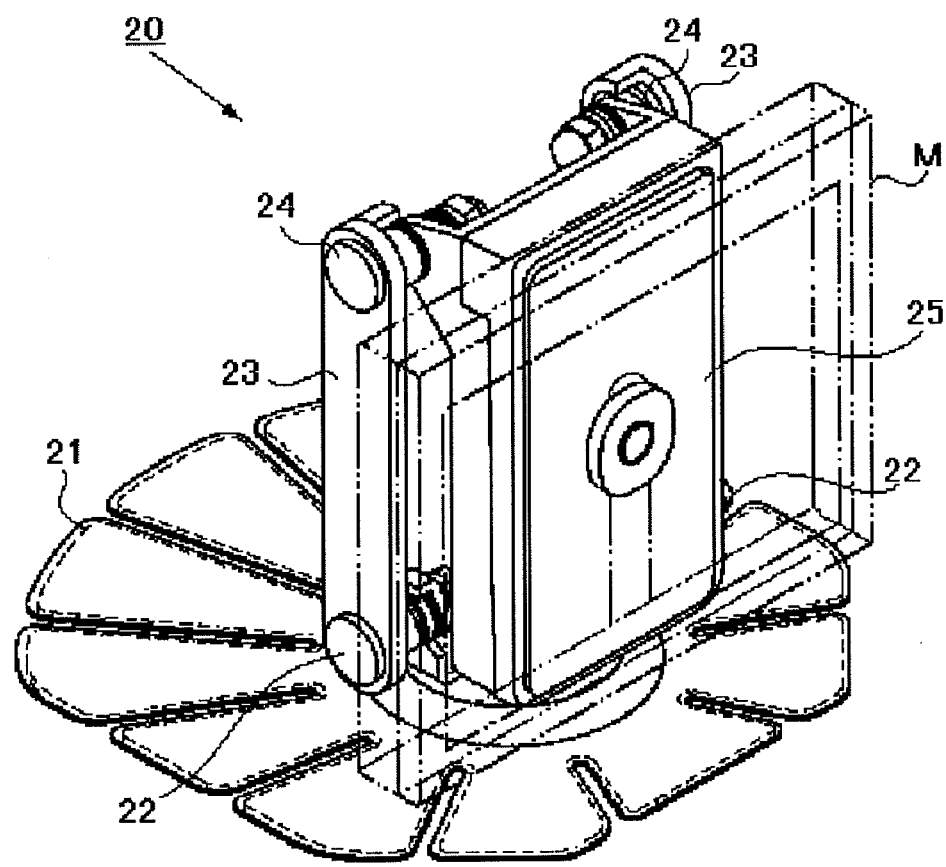
FIG. 6 is a perspective view of the external appearance of the mounting implement of a prior art.

The small diameter cylindrical sections 14c, 14d have a size that allows the protruding rods 13c, 13d to be inserted into the interior, and have guide grooves $14c_1$, $14d_1$ into which the guide projections $13c_1$, $13d_1$ are inserted formed in the inside wall surface (see FIG. 5). The first and second connection frames 13, 14 can be positioned and joined by providing the guide protrusions $13c_1$, $13d_1$ and the guide grooves $14c_1$, $14d_1$. Therefore, the two members can be prevented from being errantly joined.

The second connection frame 14 has recessed holes $14_4$, $14_4$ that are formed in the side opposite of the wall surface in which the small diameter cylindrical sections 14c, 14d are provided, i.e., in the external wall surface of the second connection frame 14 in locations that correspond to the small diameter cylindrical sections 14c, 14d, that are recessed a predetermined depth from the surface of the second connection frame 14, and that have a diameter slightly larger than the outside diameter of the small diameter cylindrical sections 14c, 14d, specifically, a diameter sufficient to allow the head sections of the setscrews 8D, 8D to be accommodated, as shown in FIG. 4. The recessed holes $14_4$, $14_4$ have openings in the center of the bottom, and the openings are in communication with the through-holes of the small diameter cylindrical sections 14c, 14d. The recessed holes $14_4$, $14_4$ have a depth such that the head sections of the setscrews 8D, 8D do not protrude in a state in which the setscrews 8D, 8D are mounted and in a state in which the protruding rods 13c, 13d are inserted.

The first and second connection frames 13, 14 and the second and fourth support shafts 7AB, 7CD are connected to each other via third and fourth movable sections. In other words, the third movable section is formed from the gear teeth $13_2$ of a first large diameter cylindrical section 13a of the first connection frame 13 and the gear teeth $7_2$ of the first T shaft 7A of the second support shaft 7AB, as well as the gear teeth $14_2$ of a third large diameter cylindrical section 14a of the second connection frame 14 and the gear teeth $7_2$ of the second T shaft 7B of the second support shaft 7AB. Similarly, the fourth movable section is formed from the gear teeth $13_2$ of a second large diameter cylindrical section 13b of the first connection frame 13 and the gear teeth $7_2$ of the third T shaft 7C of the fourth support shaft 7CD, as well as the gear teeth $14_2$ of a fourth large diameter cylindrical section 14b of the second connection frame 14 and the gear teeth $7_2$ of the fourth T shaft 7D of the fourth support shaft. The meshing of the gear teeth $7_2$, $13_2$, and $14_2$ is adjusted by the compression spring $S_1$.

The device fixation member 10 is a member for mounting the main body of a small electronic device (not shown) on which a small electronic device or the like (e.g., a display apparatus) is mounted, and is fixed to the third support shaft 6B. The device fixation member 10 has a substantially rectangular plate-shaped section 10a, a pair of side plate sections 10b, 10c erected in the forward direction in FIG. 2 from the two sides in the lengthwise direction of the plate-shaped section 10a, and a relatively long bottom plate section 10d bent in the same direction as the side plate sections 10b, 10c in the lower section in an erect state, as shown in FIGS. 2 and 3.

A cylindrical section 10e into which the non-gear section $6_2$ of the third support shaft 6B is inserted is formed in the upper back surface of the plate-shaped section 10a, and an opening $10_0$ into which a bolt 8B for fixing the third support shaft 6B is inserted is formed inside the cylinder. The forward external periphery of the opening $10_0$ of the plate-shaped section 10a accommodates fixing members, i.e., a washer $8_1$, a spring washer $8_2$, and a nut 9B, and is configured as a recess $10_1$ that does not protrude above the surface. The fixing members are fastened in the recess $10_1$, and a cover plate 15 for concealing the fixing members is thereafter mounted over the recess. A recess hole 10f for accommodating a latch pawl 12a (described later) of a latch member 12 is formed in the lower rear surface of the plate-shaped section 10a. A small protrusion 10f' for mounting a spring $S_2$ is formed on the interior wall of the recess hole 10f. Formed in a bottom plate section 10d are a pair of guide protrusions $10_2$, $10_2$ in the direction orthogonal to the lengthwise direction, and a pair of mounting protrusions $10_3$, $10_3$ in the vicinity of the two ends in the lengthwise direction. The pair of guide protrusions $10_2$, $10_2$ extends in opposing fashion inside the recess hole 10f.

The latch member 12 has a base section 12c that is slightly longer than the width of the bottom plate section 10d, and a hook-shaped latch pawl 12a that protrudes upward from one rearward end of the base section 12c, is substantially L shaped, and is formed from resin or the like. The base section 12c has a width that can be inserted between the pair of guide protrusions $10_2$, $10_2$. The latch member 12 is fixed by the cover body 11. Formed in the cover body 11 are a concave groove $11_0$ for allowing the latch member 12 to slidably move in the direction orthogonal to the lengthwise direction, and a rectangular recess hole $11_1$ provided to the upper surface of the cover body 11 and in which a female screw hole is formed in the two ends in the lengthwise direction. A plate 11A for concealing the ends of fixing screws 8E, 8E is mounted inside the recess hole $11_1$.

The latch member 12 is mounted on the bottom plate section 10d by mounting a coil spring $S_2$ on the small protrusion 10f' inside the recess hole 10f, inserting the base section 12c of the latch member 12 between the pair of guide protrusions $10_2$, $10_2$ and covering the upper portion with the cover body 11, fixing the cover body 11 from the lower surface of the bottom plate section 10d using fixing screws 8E, 8E, and mounting the cover plate $11_4$ inside the recess hole $11_1$. In accordance with this assembly, the latch member 12 is mounted in a slidably movable fashion on the bottom plate section 10d and can be inserted and drawn out from the interior of the recess hole 10f of the latch pawl 12a by pushing the end section 12b of the latch member 12. The main body of a small electronic device (not shown) is mounted on the latch pawl 12a. The device fixation member 10 is modified into a structure that conforms to the shape and structure of the main body of the small electronic device.

Next, the assembly and usage method of the device support stand 1 will be described with reference to FIGS. 1 to 4. FIG. 3 is a perspective view showing a state in which the second connection frame is mounted on the first and third support shafts and a point midway through assembly prior to the first connection frame being mounted on the first and third support shafts. FIG. 4 is a perspective view of the support stand of FIG. 3 as seen from another angle. FIG. 5 is a perspective view of the support stand of FIG. 3 as seen from the bottom section.

First, the double-sided adhesive tape 4 and the decorative plate 5 are mounted in advance on the front and reverse surfaces of the base plate 3 to produce a base 2, and the first support shaft 6A is fixed to the base 2. The first support shaft 6A is fixed by inserting the bolt 8A through bolt through-hole $6_0$ and into the screw hole $3_1$ of the base 2, mounting the flat washer $8_1$ and the spring washer $8_2$ on the ends of the bolt 8A, and thereafter fastening the nut 9A from the bottom section of the base 2.

Since a flange $8A_0$ having a diameter slightly larger than the diameter of the first support shaft 6A is attached to the head section of the bolt 8A, the apex of the first support shaft 6A is pressed over a wide surface area and is firmly fixed to the base 2. The second support shaft 7AB does not displace from above the first support shaft 6A because the flange $8A_0$ of the bolt 8A makes contact with the upper ends of semi-cylindrical sections 7a, 7a of the second support shaft 7AB in a state of contact with the external peripheral surface of the first support shaft 6A. On the other hand, the third support shaft 6B is disposed at a right angle to the support shaft in a location set at a distance from the first support shaft 6A.

The first and second connection frames 13, 14 have compression springs $S_1$ mounted on the cylindrical protrusions $13_1$, $13_1$ and the protrusions $14_1$, $14_1$, respectively, inside the large diameter cylindrical sections 13a, 13b and 14a, 14b, and the small diameter cylindrical section 7b of each of the first to fourth T shafts 7A to 7D is inserted into the large diameter cylindrical sections 13a, 13b and 14a, 14b. The compression springs $S_1$ are thereby inserted into the cavities $7_0$ of the small diameter cylindrical section 7b.

Next, the semi-cylindrical sections 7a of the T shafts 7A to 7D make contact with external peripheral surface of the first and third support shafts 6A, 6B, and the first and second connection frames 13, 14 are fixed using the setscrews 8D, 8D in a state in which the small diameter cylindrical sections 7b of the first to fourth T shafts 7A to 7D are inserted into the first and second large diameter cylindrical sections 13a, 13b and 14a, 14b of the first and second connection frames 13, 14. The fixing process is carried out by inserting the protruding guide rods 13c, 13d of the first connection frame 13 into the small diameter cylindrical sections 14c, 14d of the second connection frame 14, and threading and fixing the setscrews 8D, 8D so that a predetermined gap (e.g., 3.0 mm) is produced between the head sections of the setscrews 8D, 8D and the bottom sections of the recessed holes $14_4$, $14_4$, so that the protruding guide rods 13c, 13d can move in the joining direction with leeway inside the small diameter cylindrical sections 14c, 14d. The adjustment screw 8C is thereafter inserted into the screw hole $13_3$ of the first connection frame 13 and threaded into the female screw hole $14_3$ of the protruding rod 14e of the second connection frame 14. The first and second connection frames 13, 14 are fixed without a gap by the threading adjustment screw 8C. When the threading of the adjustment screw 8C is loosened, the second connection frame 14 can move in relation to the first connection frame 13 by a distance equal to the gap between the head section of the setscrews 8D, 8D and the bottom section of the recessed holes $14_4$, $14_4$. In this manner, the components between the first and second connection frames 13, 14 do not disassemble and fall apart even if the adjustment screw 8C is excessively loosened and dismounted when the first and second connection frames 13, 14 are fixed by two types of screws, i.e., the adjustment screw 8C and the setscrews 8D, 8D.

The fixing process causes the semi-cylindrical sections 7a, 7a of the first and second T shafts 7A, 7B to make contact with the external peripheral surface of the first support shaft 6A, whereby the gear teeth $6_1$, $7_1$ formed on the members mesh to form the first movable section, and when a gap is formed between the first and second connection frames 13, 14, the first and second T shafts 7A, 7B can rotate about the axis of the first support shaft 6A. Similarly, the semi-cylindrical sections 7a, 7a of the third and fourth T shafts 7C, 7D make contact with the third support shaft 6B, whereby the gear teeth $6_1$, $7_1$ formed on the members mesh to form the second movable section, and when a gap is formed between the first and second connection frames 13, 14, the third and fourth T shafts 7A, 7B can rotate about the axis of the third support shaft 6B.

The gear teeth $7_2$ of the small diameter cylindrical sections 7b, 7b of the first and second T shafts 7A, 7B, and the gear teeth $13_2$, $14_2$ inside the first and third large diameter cylindrical sections 13a, 14a of the first and second connection frames 13, 14 mesh between the first and second connection frames 13, 14 and the first and second T shafts 7A, 7B to form the third movable section. When a gap is formed between the first and second connection frames 13, 14, the first and second connection frames 13, 14 can rotate in the vertical direction about the axis of the small diameter cylindrical sections 7b, 7b of the first and second T shafts 7A, 7B. Similarly, the gear teeth $7_2$ of the small diameter cylindrical sections 7b, 7b of the third and fourth T shafts 7C, 7D, and the gear teeth $13_2$, $14_2$ inside the second and fourth large diameter cylindrical sections 13b, 14b of the first and second connection frames 13, 14 mesh between the first and second connection frames 13, 14 and the third and fourth T shafts 7C, 7D to form the fourth movable section. When a gap is formed between the first and second connection frames 13, 14, the first and second connection frames 13, 14 can rotate in the vertical direction about the axis of the small diameter cylindrical sections 7a, 7a of the third and fourth T shafts 7C, 7D. The meshing of the gear teeth $6_1$, $7_1$, $7_2$, $13_2$, and $14_2$ is adjusted by the compression spring $S_1$. Therefore, the meshing is smoothed and suitable snap action can be obtained when the first to fourth movable sections rotate.

The device fixation member 10 thus assembled is mounted on the non-gear section $6_2$ of the third support shaft 6B. The mounting is carried out by inserting the bolt 8B into the bolt through-hole $6_0$ of the third support shaft 6B and through the opening $10_0$ of the device fixation member 10, thereafter mounting the flat washer $8_1$ and the spring washer $8_2$ on the bolt 8B fixing the assembly using a nut 9B so as to be accommodated inside the recess $10_1$. The recess $10_1$ is covered using a cover plate 15.

In a device support stand 1 configured in this manner, the gear teeth $6_1$, $7_1$, $7_2$, $13_2$, and $14_2$ that form the first to fourth movable sections firmly mesh together because a gap is not formed between the first and second connection frames 13, 14 when the adjustment screw 8C is in a fastened state, and the device support stand 1 does not rotate in any direction and is fixed in place. When the fastening of the adjustment screw 8C is released, i.e., the adjustment screw 8C is loosened, the meshing of the gear teeth $6_1$, $7_1$, $7_2$, $13_2$, and $14_2$ that form the first to fourth movable sections is released because a predetermined gap is formed between the first and second connection frames 13, 14, and since rotation takes place on the basis of a different shaft for each of the plurality of movable sections, the orientation, angle, and the like of the device fixation member 10 in relation to the base 2 can be freely modified.

The degree of freedom of the mounting location is improved because the mounting angle of a device can be finely adjusted and the degree of freedom is improved because quadriaxial control is made possible using this manner of simple operation.

In accordance with this configuration, the third support shaft 6B is disposed at a right angle to the first support shaft 6A in a location set at a distance from the first support shaft 6A, the second and fourth support shafts 7AB, 7CD are joined to the first and third support shafts 6A, 6B, respectively, and the pair of first and second connection frames 13, 14 are joined to the second and fourth support shafts 7AB, 7CD, respectively. Therefore, the first to fourth support shafts 6A, 6B, 7AB, 7CD, and the first and second connection frames 13, 14 can be set low in relation to the dashboard or the like of a vehicle, and a car navigation device or another device mounted on the second support shaft 7AB can be moved and fixed in a low position. Therefore, a device can be moved and fixed in a low position even if the device support stand 1 is mounted on, e.g., the dashboard of an automobile, the visual field of the driver is not obstructed, and driving is not interfered.

The first and third support shafts 6A, 6B are cylindrical shafts, the second and fourth support shafts 7AB, 7CD are composed of a pair of first and second T shafts 7A, 7B or third and fourth T shafts 7C, 7D having semi-cylindrical sections 7a, 7a that make contact with the substantially semicircular peripheral surface of the first and third support shafts 6A, 6B, respectively. Therefore, the surface area of the first to fourth movable sections is increased between the first support shaft 6A and the second support shaft 7AB, and the third support shaft 6B and the fourth support shaft 7CD. The first to fourth support shafts 6A, 6B, 7AB, 7CD are stably and mutually supported by the movable sections, and the mechanical strength is increased. Also, since the first support shaft 6A and the third support shaft 6B, as well as the second support shaft 7AB and the fourth support shaft 7CD are each composed of the same constituent members, components can be shared, the types of components are reduced, the costs are reduced, and assembly is simplified.

The adjustment screw 8C can be operated without concern because the first and second connection frames 13, 14 are held by the setscrews 8D, 8D so as to not disassemble even when the adjustment screw 8C, which is the adjustment means, is excessively loosened. Since the first and second connection frames 13, 14 do not disassemble and fall apart, the rotation operation in the first to fourth movable sections and the fixing of the first to fourth support shafts 6A, 6B, 7AB, 7CD can also be stably carried out. Furthermore, the spacing between the first and second connection frames 13, 14 can be stably carried out by forming the guide members using two protruding guide rods 13c, 13d. An adjustment mechanism (adjustment screw 8C) is formed between the two protruding guide rods 13c, 13d, whereby the gap between the first and second connection frames 13, 14 can also be adjusted in a stable manner. In the example described above, the first to fourth movable sections were made to mesh with each other using the gear teeth $6_1$, $7_1$, $7_2$, $13_2$, and $14_2$, but the first to fourth movable sections may be formed using friction members that are joined by a predetermined mutual frictional force. High mechanical strength and vibration resistance can naturally be obtained in the case that the gear teeth are used, as well as in the case that frictional members are used.

The device support stand 1 of the present invention has a high degree of freedom in adjusting the angle because of quadriaxial control as described above, and another mounting member, e.g., a clip or another holding member or suction cup may be used in place of the base 2. Therefore, the device support stand can be used in various applications without concern for the mounting location or the mounting target.

The invention claimed is:

1. A device support stand, comprising:
   a mounting member for fixing a device;
   a first support shaft erectly provided from the mounting member;
   a second support shaft joined to said first support shaft via a first movable section, the shaft being extended on a line orthogonal to the first support shaft;
   a third support shaft disposed in a location set at a predetermined distance from said first support shaft;
   a fourth support shaft joined to said third support shaft via a second movable section, the shaft being extended on a line orthogonal to the third support shaft;
   a pair of first and second connection members joined to said second and fourth support shafts via third and fourth movable sections, respectively;
   a device fixation member for mounting a device, the member being mounted at one end of said third support shaft; and
   an adjustment/joining mechanism that joins said first and second connection members and adjusts the space between said first and second connection members so as to limit the rotation of said first to fourth movable sections,
   wherein said adjustment/joining mechanism adjusts a space between the first and second connection members such that the joining of the second support shaft and the first support shaft via the first movable section is disconnected, the joining of the fourth support shaft and the third support shaft via the second movable section is disconnected, and the joining of the pair of first and second connection members to the second and fourth support shafts via the third and fourth movable sections is disconnected.

2. The device support stand according to claim 1, wherein:
   said first and third support shafts each comprise cylindrical shafts having a predetermined thickness and length;
   said second and fourth support shaft comprise a pair of first and second T shafts;
   each pair of T shafts comprises a semi-cylindrical section that makes contact with the essentially semicircular peripheral surface of the cylindrical shafts of said first and third shafts, and a cylindrical section that protrudes at a right angle from the external surface of the semi-cylindrical section;
   a pair of semi-cylindrical sections of the first and second T shafts of said second support shaft is joined to the external peripheral surface of said first support shaft via the first movable section;
   a pair of semi-cylindrical sections of the first and second T shafts of said fourth support shaft is joined to the external peripheral surface of said third support shaft via the second movable section; and
   the opposing end sections of the cylindrical section between the T shafts are joined to said first and second connection members via said third and fourth movable sections, respectively.

3. The device support stand according to claim 1, wherein said first support shaft and third support shaft, and said second support shaft and fourth support shaft are formed from support shafts having the same configuration.

4. The device support stand according to claim 1, wherein:
said adjustment/joining mechanism comprises an adjustment mechanism for adjusting a space between said first and second connection members and adjusting a rotational angle and frictional force of said first to fourth movable sections, and a joining mechanism for movably guiding at least one among said first and second connection members by operation of said adjustment mechanism; and
said joining mechanism is provided with a retaining member for holding the assembly of said first and second connection members so as to prevent disassembly when said adjustment mechanism is loosened.

5. The device support stand according to claim 4, wherein:
said joining mechanism has a guide member for guiding the joining of the two connection members, being provided to one connection member among said first and second connection members, and said retaining member provided to the distal end of said guide member;
said adjustment mechanism has an adjustment screw provided to one connection member among said first and second connection members, and a screw hole into which said adjustment screw is threaded, the hole being provided to the other connection member; and
said adjustment screw is threadably joined to said screw hole, and a gap between said first and second connection members is adjusted, when adjustment is carried out by said adjustment mechanism.

6. The device support stand according to claim 5, wherein:
said guide member has two protruding guide rods;
said two protruding guide rods are provided with a predetermined spacing in the lengthwise direction of said connection members; and
said adjustment mechanism is provided between said two protruding guide rods.

7. The device support stand according to claim 1, wherein said first to fourth movable sections are formed from gear members in which gear teeth mesh with each other, or from friction members that are joined by a predetermined mutual frictional force.

8. The device support stand according to claim 1, wherein a compressive elastic member is disposed between said third and fourth movable sections.

9. The device support stand according to claim 1, wherein said mounting member comprises a holding member or a plate-shaped base having a predetermined surface area.

10. The device support stand according to claim 9, wherein:
said plate-shaped base comprises a layered body constituted by a plate-shaped base plate having a predetermined size, a double-sided adhesive tape affixed to the reverse surface of the base plate, and a decorative plate affixed to the upper surface of said plate-shaped base plate; and
a mounting section for mounting said first support shaft is provided in substantially the center of the layered body.

* * * * *